United States Patent [19]

Shimoosawa

[11] Patent Number: 5,418,625
[45] Date of Patent: May 23, 1995

[54] PICTURE IMAGE COMMUNICATION APPARATUS

[75] Inventor: Hiroyuki Shimoosawa, Yokohama, Japan

[73] Assignee: Matsushita Graphic Communication Systems, Inc., Tokyo, Japan

[21] Appl. No.: 910,918

[22] Filed: Jul. 9, 1992

[30] Foreign Application Priority Data

Nov. 18, 1991 [JP] Japan .................. 3-301565

[51] Int. Cl.$^6$ .............................................. H04N 1/32
[52] U.S. Cl. ................... 358/442; 358/434; 370/60.1; 370/110.1; 379/93; 379/100
[58] Field of Search ............... 358/400, 434, 442, 425, 358/468; 370/110.1, 60.1, 112; 379/93, 94, 100

[56] References Cited

U.S. PATENT DOCUMENTS 4,888,766 12/1989 Ogasawara ................. 370/110.1
5,034,948 7/1991 Mizutani et al. ............ 370/110.1
5,113,396 5/1992 Kagami .......................... 358/442

FOREIGN PATENT DOCUMENTS 1284066 11/1989 Japan .

Primary Examiner—Scott A. Rogers
Assistant Examiner—Thomas D. Lee
Attorney, Agent, or Firm—Lowe, Price, LeBlanc & Becker

[57] ABSTRACT

In a picture image communication apparatus having: an ISDN interface for communicating with an ISDN line; a PSTN interface for communicating with an PSTN line; and an ISDN supervisor responsive to the ISDN interface for detecting a status of the ISDN line, for transmitting a video signal indicative of a video image in G3 mode through either of the ISDN line and the PSTN line which is selected in accordance with a command signal, the improvement comprises: a controller for, in the absence of the command signal, judging the status in response to the ISDN supervisor; transmitting the video signal through the ISDN line using the ISDN interface when the status indicates that the ISDN line is usable; for transmitting the video signal through the PSTN line using the PSTN interface when the status indicates that the ISDN line is unusable. It may further comprises a scanner for scanning the video image and for producing the video signal. It may further comprises an interface for receiving the video signal externally.

4 Claims, 5 Drawing Sheets

5,418,625

PICTURE IMAGE COMMUNICATION APPARATUS

BACKGROUND OF THE INVENTION

1. Field of the Invention

This invention relates to a picture image communication apparatus and particularly to a picture image communication apparatus capable of communication through a plurality of communication networks having different specifications from each other.

2. Description of the Prior Art

A facsimile apparatus as a picture image communication apparatus is known. Such facsimile apparatus is capable of communication through a plurality of communication networks having different specifications from each other. That is, it communicates through either of the ISDN (integrated services digital network) or a telephone line network. This prior art facsimile apparatus comprises a scanner, a printer, a first interface portion for communication through the ISDN, and a second interface portion for communication through the telephone line network. This prior art facsimile apparatus can effect communication under definitions of CCITT (The International Telegraph and Telephone Consultative Committee) G3 (group 3) through the ISDN network or the telephone line network and G4 (group 4) through the ISDN. Therefore, if communication is effected in G3 mode, the operator of a calling party can select either of networks, namely, ISDN and telephone line network. When the operator selects either of lines, the facsimile apparatus calls using the selected line. If there is no selection of networks, the facsimile apparatus communicate through the ISDN.

The reasons why such prior art facsimile apparatus communicate using the ISDN in G3 mode when the telephone line network is not selected is as follows:

There is another prior facsimile apparatus capable of communication through ISDN via a telephone line network in G3 mode. If this prior art facsimile apparatus communicates with such another facsimile apparatus, the communication fee of ISDN is the same as that in the case that only the telephone line network is used and there are special services, such as a report of fee from the ISDN which is absent in the telephone line network.

However, there is a problem that this prior art facsimile apparatus frequently fails to contact with such another facsimile apparatus in G3 mode using ISDN.

The first reason is an affection of other facsimile apparatus connected to the ISDN line in the bus structure, to which this facsimile apparatus is connected. In the ISDN, if bus line structure is used in the subscriber's line, the maximum of facsimile apparatus connected to one line through the bus line is eight. However, only two channels can be used at the same time. That is, two facsimile apparatus can communicate at the same time. Therefore, if there is no free channel in the bus structure, that is, two facsimile apparatus are communicating, the other facsimile apparatus connected to the bus structure cannot communicate a third party's facsimile apparatus though the third party's facsimile apparatus is ready to communicate.

The second reason is that there is a trouble in the ISDN which is generally rarer than the first mentioned cause.

In consideration of the problems mentioned above, in G3 mode, it is thought of that call is always effected through the telephone line network. However, there is also problem that it is impossible to use the special services of the ISDN. Further, if a trouble occurs in the telephone line network, communication will result in fail totally.

On the other hand, Japanese patent application provisional publication No. 1-284066 discloses a facsimile apparatus which always makes a call with a digital networks in G4 mode when the digital network is available. When the digital network is not available, it makes a call in G3 mode through an analog telephone line network, which may resolve the problem mentioned above. However, in this prior art facsimile apparatus, there is also a problem that the facsimile apparatus selects either of G3 and G4 modes in accordance with only conditions of the networks irrespective of an intention of the operator.

SUMMARY OF THE INVENTION

The present invention has been developed in order to remove the above-described drawbacks inherent to the conventional picture image communication apparatus.

According to the present invention there is provided a first picture image communication apparatus having: an ISDN (integrated services digital network) interface for communicating with an ISDN line; a PSTN (public switch telephone network) interface for communicating with a PSTN line; and an ISDN supervisor responsive to the ISDN interface for detecting a status of the ISDN line, for transmitting a video signal indicative of a video image in G3 (The International Telegraph and Telephone Consultative Committee group 3) mode through either of the ISDN line and the PSTN line which is selected in accordance with a command signal, the improvement comprising: a control portion for, in the absence of the command signal, judging the status in response to the ISDN supervisor; transmitting the video signal through the ISDN line using the ISDN interface when the status is judged as that the ISDN line is usable; for transmitting the video signal through the PSTN line using the PSTN interface when the status indicates that the ISDN line is unusable.

According to the present invention there is also provided a second picture image communication apparatus as mentioned in first picture image communication apparatus, further comprising a scanner for scanning the video image and for producing the video signal.

According to the present invention there is also provided a third picture image communication apparatus as described in the first picture image communication apparatus, further comprising an interface for receiving the video signal.

According to the present invention there is further provided a fourth picture image communication apparatus for transmitting a video signal indicative of a video image in G3 (The International Telegraph and Telephone Consultative Committee group 3) mode comprising: an ISDN (integrated services digital network) interface for communicating with an ISDN line; a PSTN (public switch telephone network) interface for communicating with an PSTN line; a G3 control portion for transmitting the video signal in the G3 mode; a switch circuit for selecting either of a first condition that the G3 control portion communicates with the ISDN interface and a second condition that the G3 control portion communicates with the PSTN interface; an ISDN supervisor responsive to the ISDN interface for detecting a status of the ISDN line; a first operation circuit responsive to a first manual operation for producing a first command signal indicative of use of the ISDN line; a second operation circuit responsive to a second manual operation for producing a second command signal indicative of use of the PSTN line; a telephone number input circuit responsive to a third manual operation for inputting a telephone number of a called party; and a control portion: in the presence of the first command signal, for effecting a first function for causing the switch circuit to select the first condition; causing the ISDN interface to communicating with the ISDN line and to call the called party with the telephone number; and causing the G3 control portion to transmitting the video signal to the ISDN line through the ISDN interface; in the presence of the second command signal for causing the switch circuit to select the second condition; causing the PSTN interface to communicate with the PSTN line and to call the called party with the telephone number; and causing the G3 control portion to transmitting the video signal to the PSTN line through the PSTN interface; and in the absence of both of the first and second command signal, for effecting the first function; then, detecting the status of the ISDN line; judging the status; for effecting the second function when the status is Judged as a failure in communication with the called party; and for effecting the second function.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of this invention with reference to drawings.

Figure 1:
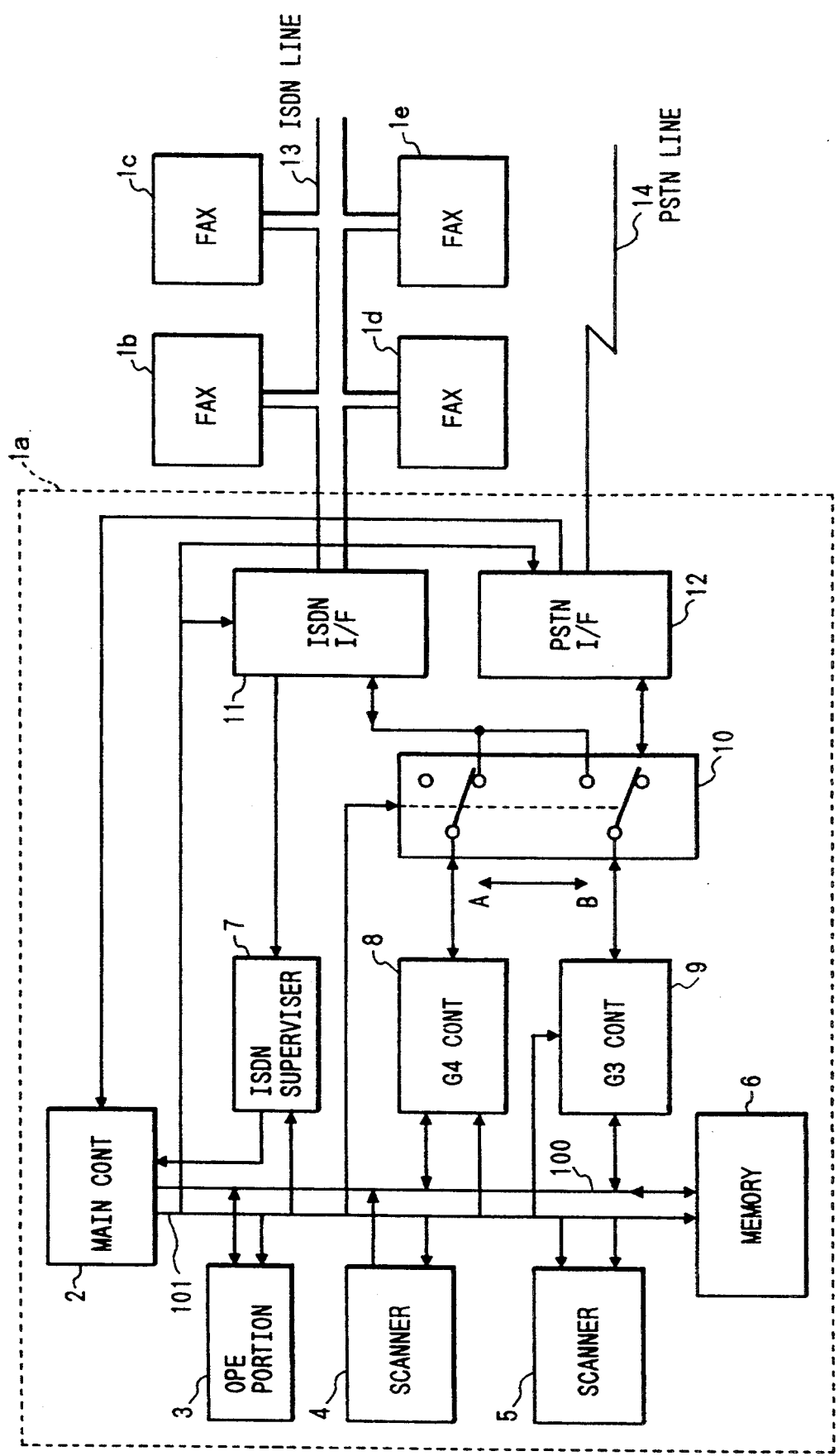
FIG. 1 is a block diagram of an embodiment of a facsimile apparatus.

FIG. 1 is a block diagram of the embodiment of the picture image communication.

A facsimile apparatus (FAX) 1a as the picture image communication apparatus comprises a scanner 4 for reading out a picture image of a document or the like to produce a signal and for outputting video data; a memory 6 for storing the video data from the scanner 4, video data received from another facsimile apparatus, and other control data; a printer 5 for reproducing a picture image from video data from the memory 6; a main control portion 2 for controlling respective portions of the facsimile apparatus 1; an operation portion 3 for receiving commands from an operator, for example, a command for selecting G3 or G4 communication to produce command signals sent to the main control portion, and for displaying data concerning operations; an ISDN interface 11 for communicating with another facsimile apparatus through the ISDN (integrated services digital network) in response to a ISDN interface control signal; a G4 control portion 8 for making communication with another facsimile apparatus under the G4 protocol through the ISDN interface 11 in response to a G4 communication control signal from the main control portion 2; a PSTN interface 12 for communicating with another facsimile apparatus (not shown) through the PSTN (public switch telephone network) in response to a PSTN interface control signal; a G3 control portion 9 for making communication with another facsimile apparatus under G3 protocol through the ISDN interface 11 or a PSTN interface 12 in response to a G3 communication control signal from the main control portion 2 through a switch 10; the selector 10 for selecting either of ISDN interface 11 or the PSTN interface 12 to be communicated in response to a switching control signal from the main control portion 2; and a supervisor portion 7 for supervising a communication condition of the ISDN in response to the ISDN interface 11. This facsimile apparatus 1a is connected to an ISDN through the ISDN interface 11 and to PSTN through the PSTN interface 12. Fax apparatus 1b to 1e have the same structure of the facsimile apparatus 1a and are connected to the ISDN line 13 in the bus structure together with the facsimile apparatus 1a. Numeral 100 denotes data bus lines for interchanging data among respective elements of the facsimile apparatus 1a. Numeral 101 denotes control signal bus for sending control signals to respective elements of the facsimile apparatus 1a.

Herein below will be described operation of the embodiment of this invention.

Figure 2:
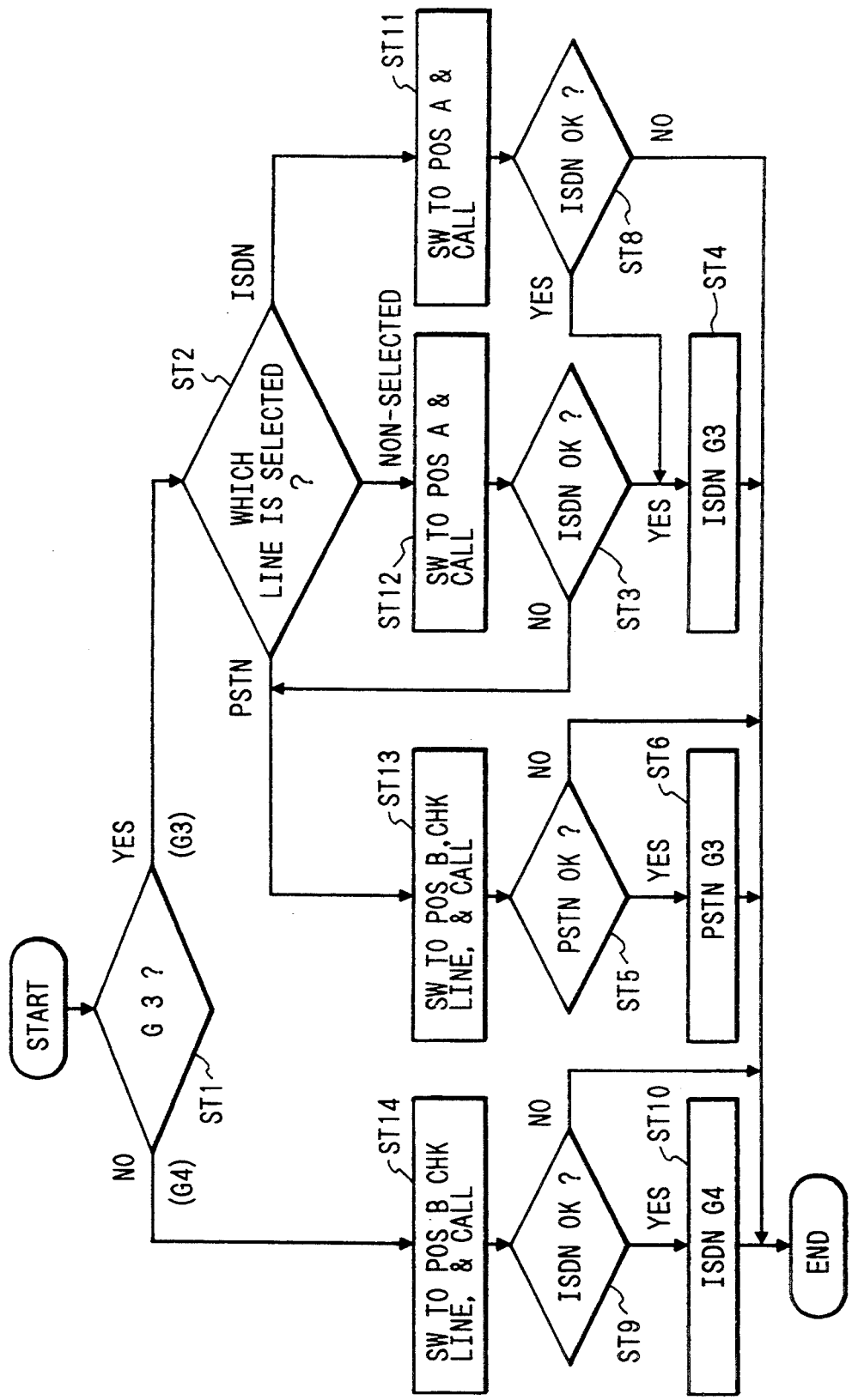
FIG. 2 shows a flow chart of this embodiment showing transmission operation.

FIG. 2 shows a flow chart of this embodiment showing transmission operation. The main control portion 2 comprises a microprocessor and executes a stored program represented by the flow chart of FIG. 2.

At first, the operator inputs a telephone number of called facsimile apparatus and a command indicating which mode of G3 and G4 is selected with the operation portion 3. If the PSTN interface 12 is connected to the PSTN through an extension, the line selection of ISDN or PSTN is effected by the operator.

A document is read out by the scanner 3 and sends the video data to the memory 6 once under control of the control portion 2. Basically, when the G3 mode is selected the stored video data is sent under control of the G3 control portion 9 and when the G4 mode is selected it is sent under control of the G4 control portion 7. However, in accordance with the operation by the operator, the control portion 2 controls communication as follows:

Processing starts in a step ST1. In the step ST1, a decision is made as to whether or not the operator selects the G3 mode. If YES, processing proceeds to a step ST2. In the step ST2, a decision is made as to which line of ISDN line 13 or PSTN line 14 is selected; and another decision is made whether neither of ISDN line 13 and PSTN line 14 is selected. If the ISDN is selected, processing proceeds to a step ST11. In the step ST11, the main control portion 2 causes the switch 10 to allow the G3 control portion 9 to communicate with the ISDN interface 11, that is, it changes the switch position of the switch 10 to a position A as shown in FIG. 1. In the step ST11, the main control portion 2 also causes the ISDN interface 11 to call the third party's facsimile apparatus through the ISDN line 13. Then, the main control portion 2 checks the condition of the ISDN line 13 by watching an output of the ISDN supervisor 7. The ISDN supervisor 7 detects whether the ISDN line 13 is free from another facsimile apparatus 1b to 1e and whether or not the called party responds for a predetermined interval. The main control portion 2 makes a decision as to whether or not the call through the ISDN line is succeeded by watching the output of the ISDN supervisor 7 in a step ST8. If YES, processing proceeds to a step ST4. In the step ST4, the main control portion 2 causes the G3 control portion 9 and the ISDN interface 11 to start communication with the third party's facsimile apparatus under the G3 protocol.

In the step ST8, if the answer is NO, that is, the call resulted in fail, processing ends.

In the step ST2, if neither lines is selected, processing proceeds to a step ST 12. In the step ST12, the main control portion 2 causes the switch 10 to allow the G3 control portion 9 to communicate with the ISDN interface 11, that is it changes the switch position of the switch 10 to a position A as shown in FIG. 1. In the step ST12, the main control portion 2 also causes the ISDN interface 11 to call the third party facsimile apparatus through the ISDN line 13. Then, the main control portion 2 checks the condition of the ISDN line 13 by watching an output of the ISDN supervisor 7. The ISDN supervisor 7 detects whether the ISDN is free from another facsimile apparatus 1b to 1e and whether or not the called party responds for the predetermined interval. The main control portion 2 makes a decision as to whether or not the call through the ISDN line is succeeded by watching the output of the ISDN supervisor 7. If YES, processing proceeds to a step ST4. In the step ST4, the main control portion 2 causes the G3 control portion 9 and the ISDN interface 11 to start communication with the third party's facsimile apparatus under the G3 protocol.

In the step ST3, if the answer is NO, that is, the call resulted in fail, processing proceeds to a step ST13.

In the step ST13, the main control portion 2 causes the switch 10 to allow the G3 control portion 9 to communicate with the PSTN interface 12, that is it changes the switch position of the switch 10 to a position B shown in FIG. 1. In the step ST13, the main control portion 2 also checks the status of the PSTN line 14 by observing the output of the PSTN interface 12. For example, it checks the presence of a tone signal of the PSTN line 14. Then, the main control portion 2 causes the PSTN interface 12 to call the third party's facsimile apparatus through the PSTN line 14. Then, the main control portion 2 checks whether or not the called party responds. In the following step ST 5, the main control portion 2 makes a decision as to whether or not the call through the PSTN line 14 is succeeded by watching the output of the PSTN interface 12. If YES, processing proceeds to a step ST6. In the step ST4, the main control portion 2 causes the G3 control portion 9 and the PSTN interface 12 to start communication with the third party's facsimile apparatus under the G3 protocol.

In the step ST5, if the answer is NO, that is, the call resulted in fail, for example the called party does not respond for a given interval, processing ends.

In the step ST1, if the answer is NO, that is, the operator selects the G4 mode, processing proceeds to a step ST14. In the step ST14, the main control portion 2 causes the switch 10 to allow the G4 control Portion 8 to communicate with the ISDN interface 11, that is it changes the switch position of the switch 10 to a position B as shown in FIG. 1. In the step ST14, the main control portion 2 also causes the ISDN interface 11 to call the third party's facsimile apparatus through the ISDN line 13. Then, the main control portion 2 checks the condition of the ISDN line by watching the output of the ISDN supervisor 7. The ISDN supervisor 7 detects whether the ISDN line 13 is free from another facsimile apparatus 1b to 1e and whether or not the called party responds. At step ST9 the main control portion 2 makes a decision as to whether or not the call through the ISDN line 13 is succeeded by watching the output of the ISDN supervisor 7. If YES, processing proceeds to a step ST10. In the step ST10, the main control portion 2 causes the G4 control portion 8 and the ISDN interface 11 to start communication with the third party's facsimile apparatus under the G4 protocol.

In the step ST9, if the answer is NO, that is, the call resulted in fail, processing ends.

Figure 3:
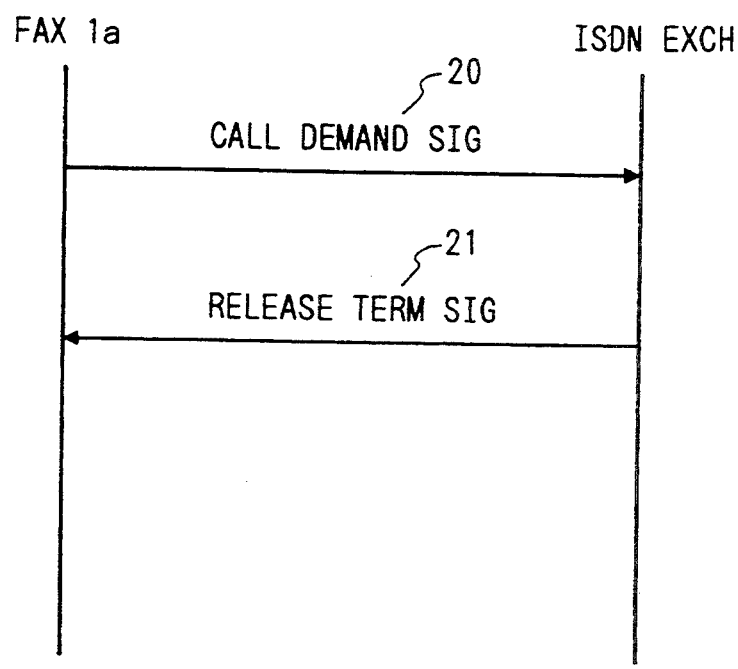
FIG. 3 is an explanatory drawing of this embodiment for illustrating a sequence of communication in the ISDN.

The conditions that calling through the ISDN line 13 is judged as failure in the steps ST3 and ST8 are as follows:

The first case is that there is no free channel of the ISDN line because two other facsimile apparatus are using this ISDN line 13. Normally, this refusal case occurs most frequently. FIG. 3 is an explanatory drawing of this embodiment for illustrating a sequence OF communication in this refusal case.

Figure 4:
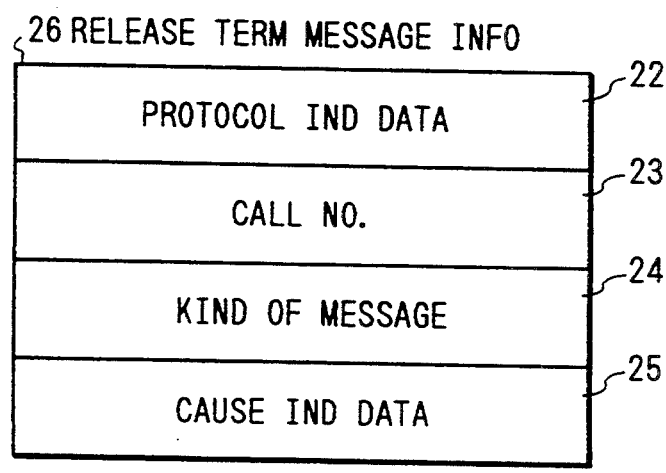
FIG. 4 is an explanatory drawing of this embodiment for illustrating contents of the release termination message information used in the sequence of communication in the ISDN.

When the ISDN interface 11 of the facsimile apparatus 1a sends a call demand signal 20 to the ISDN, that is, an exchange of the ISDN, the ISDN exchange returns a release termination signal 21 to the facsimile apparatus 1a. The release termination signal 21 includes release termination message information 26. FIG. 4 is an explanatory drawing of this embodiment for illustrating contents of the release termination message information 26, shown in FIG. 4. The release termination message information 26 includes protocol identification data 22, a call number 23, kind-of-message data 24, and a cause indication data 25. The cause indication data 25 indicates this refusal case, that is, it indicates that two other facsimile apparatus are using this ISDN line 13 with a predetermined code "#34". This predetermined code "#34" is detected by the ISDN supervisor 7 and informed to the main control portion 2.

Figure 5:
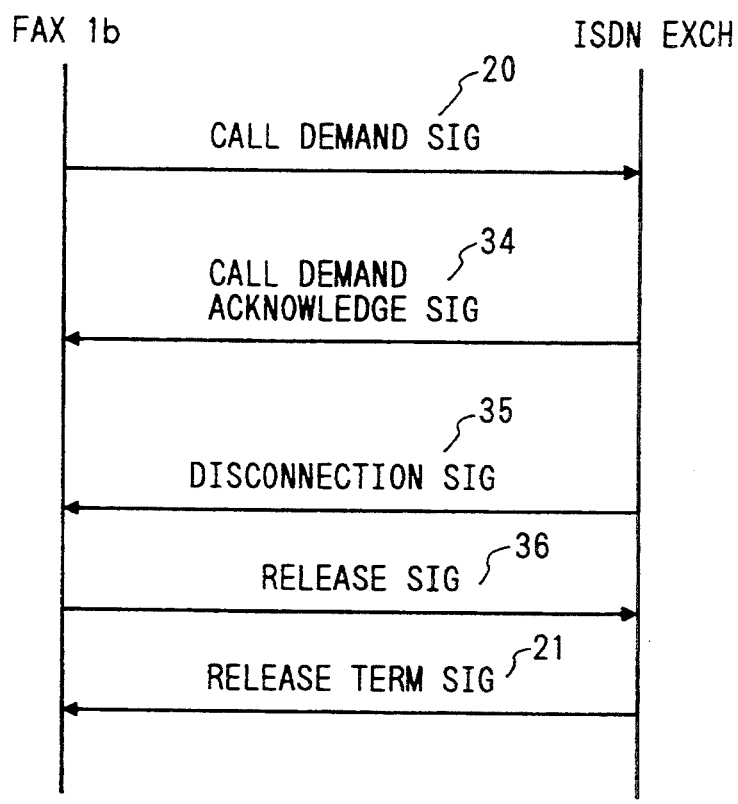
FIG. 5 is an explanatory drawing of this embodiment for illustrating a sequence of communication in the ISDN.

The second case is that some trouble occurs in the ISDN which is informed with a predetermined code, such as "#38" indicative of network in trouble, "#41" indicative of temporary trouble, or "#42" indicative of a busy state in the exchange, "#43". FIG. 5 is an explanatory drawing of this embodiment for illustrating a sequence of communication in this refusal case.

When the ISDN interface 11 of the facsimile apparatus 1a sends a call demand signal 20 to the ISDN, that is, an exchange of tile ISDN, the ISDN exchange returns a call demand acknowledge signal 34 and a disconnection signal sequentially to the facsimile apparatus 1a. These signals are informed to the main control portion 2 through the ISDN supervisor 7. In response to this disconnection signal 35, the main control portion 2 sends a release signal 36 to the ISDN exchange. In response to this, the ISDN exchange returns the release termination signal 21 to the facsimile apparatus 1a.

Figure 6:
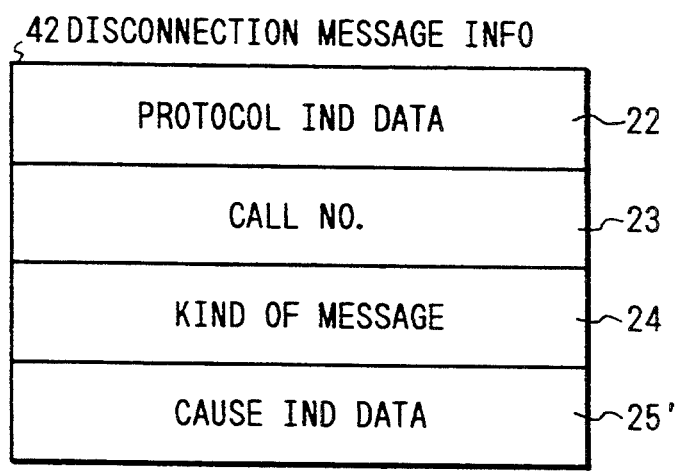
FIG. 6 is ; an explanatory drawing of this embodiment for illustrating contents of the disconnection message information used in this embodiment.

The disconnection signal 35 includes disconnection message information 42. FIG. 6 is an explanatory drawing of this embodiment for illustrating contents of the disconnection message information 42. The disconnection message information 42 includes protocol identification data 22, a call number 23, kind-of-message data 24, and a cause indication 25'. The cause indication data 25' indicates this case, that is, it indicates that there is a trouble in the ISDN with the predetermined codes, such as "#38" indicative of network in trouble, "#41" indicative of temporary trouble, or "#42" indicative of a busy state in the exchange, "#43".

The third case is that the ISDN supervisor 7 detects the absence of power supply from the ISDN line.

When the main control portion 2 detects these cases, it judges the ISDN unusable in the steps ST3, ST5, and ST9.

Hereinbelow will be described operation of reception of call.

When a call from other facsimile apparatus through the ISDN arrives this facsimile apparatus 1a in the G4 mode, the ISDN supervisor 7 detects the arrival of the call of G4 mode and informs this to the main control portion 2. In response to this, the main control portion 2 causes the switch 10 to move to the position B; the ISDN interface 11 to respond the call to the ISDN exchange; and the G4 control portion 8 to decode the received information and to send the decoded data to the printer 5 through the memory 6.

When a call from other facsimile apparatus through the ISDN arrives this facsimile apparatus 1a in the G3 mode, the ISDN supervisor 7 detects the arrival of the call of G3 mode and informs this to the main control portion 2. In response to this, the main control portion 2 causes the switch 10 to move to the position A; the ISDN interface 11 to respond the call from the ISDN exchange; and the G3 control portion 8 to decode the received information and to send the decoded data to the printer 5 through the memory 6.

When a call from other facsimile apparatus through the PSTN line arrives this facsimile apparatus 1a, the PSTN interface 12 detects the arrival of the call and informs this to the main control portion 2. In response to this, the main control portion 2 causes the switch 10 to move to the position B; the PSTN interface 11 to respond to the call from the PSTN exchange; and the G3 control portion 8 to decode the received information and to send the decoded data to the printer 5 through the memory 6.

As mentioned above, the facsimile apparatus of this embodiment judges whether a call through the ISDN is possible or not when a video data is transmitted in the G3 mode and whether or not the network to be used is not selected. If it judges the call through the ISDN possible, it transmits the video image through the ISDN in the G3 mode. Therefore, this facsimile apparatus can utilize the maximum service from the ISDN. Moreover, in the ISDN, there are frequently refused cases of call. In such case or in the case of trouble in the ISDN, the facsimile apparatus 1a can transmit the video data using the PSTN line 14 in place of the ISDN line 13 if the called party's facsimile apparatus is ready to respond.

Figure 7:
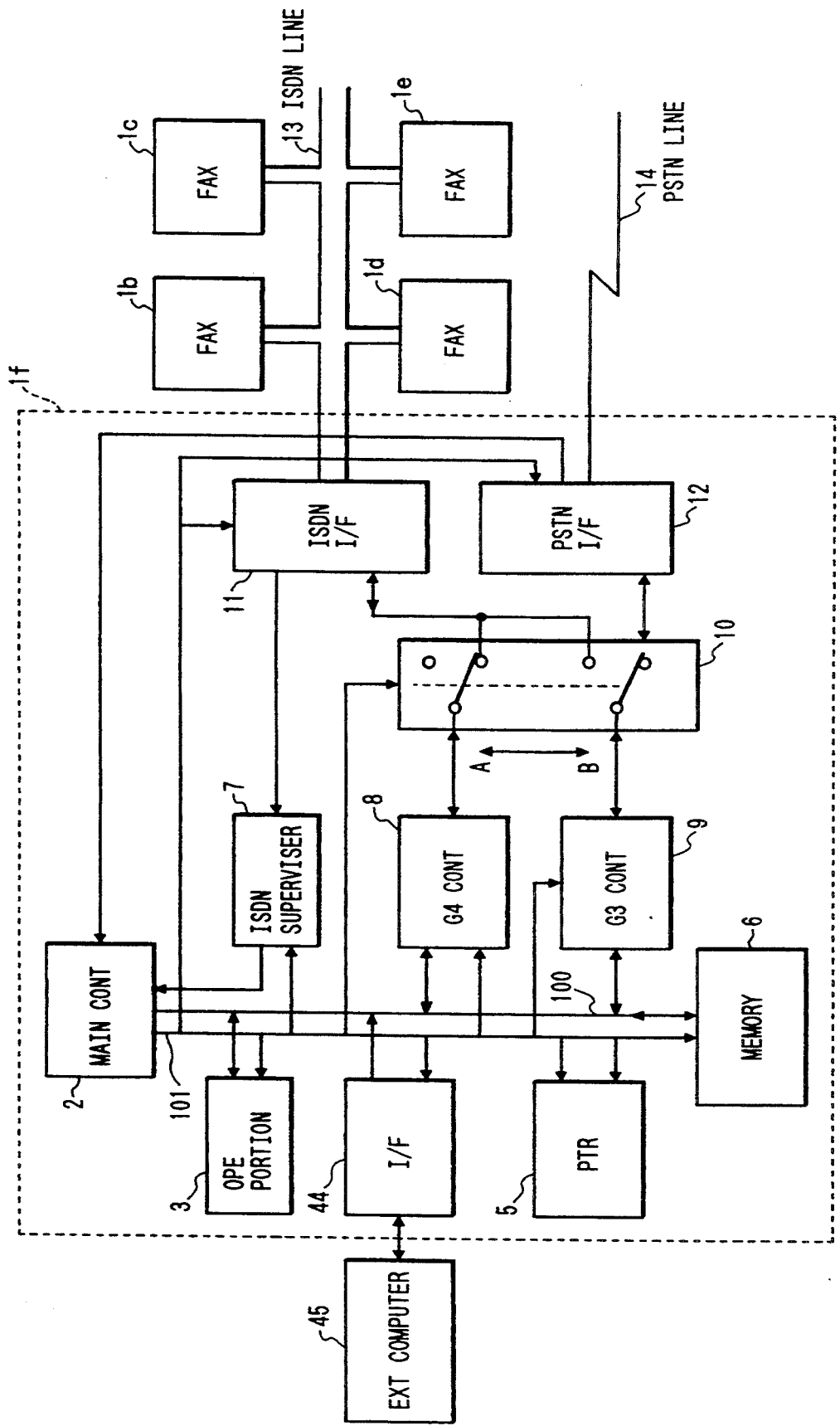
FIG. 7 is a block diagram of such a modified embodiment of the picture image communication.

In this embodiment, the facsimile apparatus 1a includes the scanner 4 and the printer, that is, the video data is obtained from the facsimile apparatus 1a itself and used in the facsimile apparatus 1a. However, the video data may be supplied from or to an external computer. FIG. 7 is a block diagram of such a modified embodiment of a facsimile apparatus 1f. In FIG. 7, an interface 44 receives the video data from an external computer 45.

What is claimed is:

1. A picture image communication apparatus having: ISDN (integrated services digital network) interface means for communicating with an ISDN line; PSTN public switch telephone network) interface means for communicating with a PSTN line; and ISDN supervisor means responsive to said ISDN interface means for detecting a status of said ISDN line, for transmitting a video signal indicative of a video image in G3 (The International Telegraph and Telephone Consultative Committee group 3) mode through either of said ISDN line and said PSTN line which is selected in accordance with a command signal, the improvement comprising:

control means operating for establishing a default condition in response to detection of an absence of said command signal, for determining said status of said ISDN line in response to said ISDN supervisor means in said default condition, for transmitting said video signal through said ISDN line using said ISDN interface responsive to a determination that said ISDN line is usable in said default condition, and for transmitting said video signal through said PSTN line using said PSTN interface means responsive to a determination that said ISDN line is unusable in said default condition, first means responsive to operator input for generating a first command signal for indicating operator selection of said ISDN line for transmission of said video signal;

second means responsive to operator input for generating a second command signal for indicating operator selection of said PSTN line for transmission of said video signal; and third means for detecting presence and absence of said first and second command signals and for establishing said default condition in response to detecting absence of both said first and second command signals, further comprising selecting switching means for first selecting said ISDN line responsive to detection of presence of said first command signal by said third means and for secondly selecting said ISDN line responsive to said default condition established by said third means, first ISDN check means for checking a condition of said ISDN line responsively to said selecting switching means first selecting said ISDN line responsive to presence of said first command signal, and second ISDN check means for checking the condition of said ISDN line responsively to said selecting switching means secondly selecting said ISDN line responsive to said default condition established in absence of said first and second command signals, each of said first and second ISDN check means responsive to a determination of availability of said ISDN line by causing ISDN transmitting means to transmit said video signals through said ISDN line, said first ISDN check means responsive to a determination of a failure condition of said ISDN line by terminating operation, and said second ISDN check means responsive to a determination of a failure condition of said ISDN line by causing said selecting switching means to select said PSTN line for transmission of said video signals.

2. A picture image communication apparatus as claimed in claim 1, wherein said selecting switching means further operates for selecting said PSTN line responsive to detection of presence of said second command signal by said third means, and further comprising PSTN check means, responsive to selection by said selecting switching means responsively to presence of said second command signal and responsively to operation of said second ISDN check means in response to determination of a failure condition of said ISDN line, for checking a condition of said PSTN line, said PSTN check means responsive to a determination of a failure condition of said PSTN line by terminating operation, said PSTN check means responsive to a determination of availability of said PSTN line by causing PSTN transmitting means to transmit said video signals through said PSTN line, wherein said control means comprises means for detecting a first condition wherein said further comprising a scanner for scanning said video image and for producing said video signal.

3. A picture image communication apparatus as claimed in claim 1, further comprising:

second ISDN transmitting means for transmitting said video signals through said ISDN line in G4 operation, wherein said selecting switching means further operates for thirdly selecting said ISDN line responsive to a G4 command signal for selecting transmission of said video signal in G4 operation, third ISDN check means for checking the condition of said ISDN line responsively to said selecting switching means thirdly selecting said ISDN line responsive to said G4 command signal, said third ISDN check means responsive to a determination of a failure condition of said ISDN line by terminating operation, and said third ISDN check means further responsive to a determination of availability of said ISDN line by causing said second ISDN transmitting means to transmit said video signals through said ISDN line using a G4 operating protocol.

4. A picture image communication apparatus as claimed in claim 3, wherein said selecting switching means comprises a multi position switch apparatus, said switch apparatus having a first input connected to a G4 control means, a second input connected to a G3 control means, and a control input connected to said control means, a first input connected to an ISDN interface to said ISDN line and a second output connected to a PSTN interface to said PSTN line, said switch apparatus responsive to a first control signal from said control means provided to said control input by switching to a first position, wherein said G4 control means is disconnected from both of said ISDN interface and said PSTN interface and said G3 control means is connected to said ISDN interface, said switch apparatus responsive to a second control signal from said control means provided to said control input by switching to a second position, wherein said G4 control means is connected to said ISDN interface and said G3 control means is connected to said PSTN interface, said control means generating said G4 command signal for connecting said G4 control means to said switch apparatus and disconnecting said G3 control means from said switch apparatus, and generating a G3 command signal for connecting said G3 control means to said switch apparatus and disconnecting said G4 control means from said switch apparatus, said third means responsive to said G3 command signal for detecting said presence and absence of said first and second command signals and for establishing said default condition in response to detecting absence of both said first and second command signals.

* * * * *